US011030850B2

(12) United States Patent
Asher et al.

(10) Patent No.: US 11,030,850 B2
(45) **Date of Patent: *Jun. 8, 2021**

(54) MANAGING BETS THAT SELECT EVENTS AND PARTICIPANTS

(71) Applicant: CANTOR INDEX, LLC, New York, NY (US)

(72) Inventors: Joseph M. Asher, Las Vegas, NV (US); Kenneth L. Miller, New York, NY (US)

(73) Assignee: CANTOR INDEX, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,172

(22) Filed: Apr. 6, 2020

(65) Prior Publication Data

US 2020/0234534 A1 Jul. 23, 2020

Related U.S. Application Data

(63) Continuation of application No. 16/272,021, filed on Feb. 11, 2019, now Pat. No. 10,636,246, which is a continuation of application No. 14/816,562, filed on Aug. 3, 2015, now Pat. No. 10,229,553, which is a continuation of application No. 10/771,076, filed on Feb. 3, 2004, now Pat. No. 9,098,883.

(51) Int. Cl.
*G06F 17/00* (2019.01)
*G07F 17/32* (2006.01)
*G06Q 50/34* (2012.01)

(52) U.S. Cl.
CPC ......... *G07F 17/3223* (2013.01); *G06Q 50/34* (2013.01); *G07F 17/3258* (2013.01); *G07F 17/3272* (2013.01); *G07F 17/3288* (2013.01)

(58) Field of Classification Search
CPC ............ G07F 17/3223; G07F 17/3272; G07F 17/3258; G07F 17/3288; G06Q 50/34
USPC ...................................... 273/139; 463/42, 25
See application file for complete search history.

(56) References Cited

U.S. PATENT DOCUMENTS 3,909,002 A 9/1975 Levy
4,874,177 A 10/1989 Girardin
(Continued)

FOREIGN PATENT DOCUMENTS

AU 2004297887 6/2005
AU 2017232095 1/2020
(Continued)

OTHER PUBLICATIONS

Notification of Transmittal of the International Search Report and the Written Option of the International Searching Authority, dated Jul. 28, 2005, International Application No. PCT/US05/06314 (10 pp.).

(Continued)

*Primary Examiner* — Masud Ahmed

(57) ABSTRACT

A method of managing bets is provided. The method includes receiving one or more bets. Each bet comprises a selection of a first number of events selected from a group of events, a selection of a respective participant for each of the first number of events selected and a bet amount. The method also includes combining each bet amount to form a betting pool and determining an amount of a total payout based at least in part on the betting pool.

20 Claims, 5 Drawing Sheets

EVENT SELECT BET AND RESULT DATA

| EVENT | BETTOR 1 | BETTOR 2 | BETTOR 3 | BETTOR 4 | WINNING PARTICIPANT (ODDS) |
|---|---|---|---|---|---|
| RACE 1 | | HORSE #5 | HORSE #5 | | HORSE #5 (15-1) |
| RACE 2 | HORSE #8 | | HORSE #6 | | HORSE #6 (3-1) |
| RACE 3 | | HORSE #8 | | HORSE #8 | HORSE #8 (12-1) |
| RACE 4 | HORSE #6 | HORSE #1 | | HORSE #1 | HORSE #1 (10-1) |
| RACE 5 | | | | HORSE #2 | HORSE #1 (9-5) |
| RACE 6 | HORSE #1 | | HORSE #3 | HORSE #2 | HORSE #3 (3-2) |
| RACE 7 | HORSE #2 | | | HORSE #2 | HORSE #2 (15-1) |
| RACE 8 | HORSE #6 | HORSE #6 | | | HORSE #6 (20-1) |
| RACE 9 | | HORSE #5 | HORSE #5 | | HORSE #5 (11-1) |
| RACE 10 | | | HORSE #7 | | HORSE #7 (5-2) |
| KENTUCKY DERBY | HORSE #10 | HORSE #1 | HORSE #2 | HORSE #7 | HORSE #2 |
| BET AMOUNT | $1.00 | $5.00 | $2.00 | $1.00 | |

(56) References Cited

U.S. PATENT DOCUMENTS 4,962,950 A 10/1990 Champion
5,275,400 A 1/1994 Weingardt et al.
5,374,060 A 12/1994 Goldberg
5,452,899 A 9/1995 Skratulia et al.
5,570,885 A 11/1996 Ornstein
5,573,244 A 11/1996 Mindes
5,586,937 A 12/1996 Menashe
5,672,106 A 9/1997 Orford et al.
5,687,968 A 11/1997 Tarantino
5,713,793 A 2/1998 Holte
5,741,181 A 4/1998 Nakagawa et al.
5,743,525 A 4/1998 Haddad
5,749,785 A 5/1998 Rossides
RE35,864 E 7/1998 Weingardt et al.
5,830,063 A 11/1998 Byrne
5,830,068 A 11/1998 Brenner et al.
5,839,726 A 11/1998 Luise
5,842,921 A 12/1998 Mindes et al.
5,888,136 A 3/1999 Herbert
5,957,775 A 9/1999 Cherry
5,984,779 A 11/1999 Bridgeman
6,004,211 A 12/1999 Brenner
6,048,269 A 4/2000 Burns
6,113,492 A 9/2000 Walker
6,120,376 A 9/2000 Cherry
6,126,543 A 10/2000 Freedman
6,152,822 A 11/2000 Herbert
6,210,275 B1 4/2001 Olsen
6,287,199 B1 9/2001 McKeown
6,296,569 B1 10/2001 Comgello
6,309,307 B1 10/2001 Krause
6,325,721 B1 12/2001 Myamoto
6,331,148 B1 12/2001 Krause
6,354,592 B1 3/2002 Virzi
6,358,150 B1 3/2002 Mir et al.
6,364,765 B1 4/2002 Walker
6,383,074 B1 5/2002 Boggs
6,450,887 B1 9/2002 Mir et al.
6,527,270 B2 3/2003 Maksymec
6,527,638 B1 3/2003 Walker
6,554,708 B1 4/2003 Brenner et al.
6,599,193 B2 7/2003 Baerlocher
6,688,978 B1 2/2004 Herman
6,695,701 B2 2/2004 Aronson
6,712,701 B1 3/2004 Boylan, III et al.
6,722,980 B2 4/2004 Stronach
6,786,824 B2 9/2004 Cannon
6,811,483 B1 11/2004 Webb et al.
6,837,789 B2 1/2005 Garahi et al.
6,837,791 B1 1/2005 McNutt
6,926,607 B2 8/2005 Slomiany et al.
6,929,550 B2 8/2005 Hisad
7,147,557 B1 12/2006 Tracy et al.
7,201,658 B2 4/2007 Marshall
7,311,606 B2 12/2007 Amaitis
7,351,149 B1 4/2008 Simon et al.
8,905,832 B2 12/2014 Miller
9,852,488 B2 12/2017 Amaitis
9,908,883 B2 3/2018 Didiuk et al.
2001/0031656 A1 10/2001 Marshall et al.
2001/0034262 A1 10/2001 Banyai
2001/0039209 A1 11/2001 DeWeese
2001/0041612 A1 11/2001 Garahi et al.
2001/0047291 A1 11/2001 Garahi et al.
2001/0051540 A1 12/2001 Hindman
2002/0049975 A1 4/2002 Thomas
2002/0077712 A1 6/2002 Safaei et al.
2002/0094853 A1 7/2002 Hayashi
2002/0115488 A1 8/2002 Berry
2002/0149152 A1 10/2002 Taylor
2002/0151340 A1 10/2002 Guinn
2002/0177483 A1 11/2002 Cannon
2002/0183105 A1 12/2002 Cannon
2003/0017867 A1 1/2003 deKeller
2003/0054870 A1 3/2003 Sato
2003/0096646 A1 5/2003 Nzhu
2003/0119582 A1 6/2003 Ocampo
2003/0125822 A1 7/2003 LaNeve
2003/0157976 A1 8/2003 Simon et al.
2003/0212623 A1* 11/2003 Aylmer .................. G06Q 40/04 705/37
2004/0004656 A1 1/2004 Sambongi
2004/0006484 A1 1/2004 Manis
2004/0009812 A1 1/2004 Scott
2004/0039461 A1 2/2004 Stefani
2004/0048656 A1* 3/2004 Krynicky ............... G06Q 50/34 463/25
2004/0063484 A1 4/2004 Dreaper et al.
2004/0104845 A1 6/2004 McCarthy
2004/0111358 A1* 6/2004 Lange .................... G06Q 40/04 705/37
2004/0192437 A1 9/2004 Amaitis et al.
2004/0193469 A1 9/2004 Amaitis et al.
2004/0193531 A1 9/2004 Amaitis et al.
2004/0198483 A1 10/2004 Amaitis
2004/0204245 A1 10/2004 Amaitis et al.
2004/0023542 A1 11/2004 Stronach
2004/0229671 A1 11/2004 Stronach et al.
2004/0235542 A1* 11/2004 Stronach ................ G06Q 30/06 463/6
2005/0032565 A1 2/2005 Cheng
2005/0044575 A1 2/2005 Kuyl et al.
2005/0049731 A1 3/2005 Dell
2005/0075164 A1 4/2005 Krynicky
2005/0085293 A1 4/2005 Lindo
2005/0102223 A1 5/2005 Vlazny et al.
2005/0107151 A1 5/2005 Amaitis et al.
2005/0107153 A1 5/2005 Jubinville et al.
2005/0116410 A1* 6/2005 Vlazny ................... G07F 17/32 273/139
2005/0148379 A1 7/2005 Huard
2005/0170886 A1 8/2005 Miller
2005/0176495 A1 8/2005 Stronach
2005/0176496 A1* 8/2005 Stronach ................ G07F 17/32 463/25
2005/0176499 A1* 8/2005 Stronach ................ G07F 17/32 463/27
2005/0181862 A1 8/2005 Asher et al.
2005/0181868 A1 8/2005 Vlazny
2005/0187000 A1 8/2005 Miller
2005/0227757 A1 10/2005 Simon
2006/0068874 A1 3/2006 Hornik
2006/0073870 A1 4/2006 Cannon
2006/0135252 A1 6/2006 Amaitis et al.
2006/0148559 A1 7/2006 Jordan
2006/0214376 A1 9/2006 Weller
2006/0009281 A1 12/2006 Stronach
2007/0026939 A1 2/2007 Asher et al.
2007/0026940 A1 2/2007 Cannella
2007/0184890 A1 8/2007 Ollington
2008/0113816 A1 5/2008 Mahaffey et al.
2008/0248850 A1 10/2008 Schugar
2009/0088232 A1 4/2009 Amaitis et al.
2010/0331066 A1 12/2010 Jung et al.
2012/0034961 A1 2/2012 Berman et al.
2014/0141850 A1 5/2014 Miller
2014/0235305 A1 8/2014 Asher et al.
2015/0248816 A1 9/2015 Miller
2015/0279164 A1 10/2015 Miller
2016/0098893 A1 4/2016 Asher et al.
2018/0082394 A1 3/2018 Amaitis
2019/0172308 A1 6/2019 Asher et al.
2019/0221081 A1 7/2019 Asher et al.
2019/0392681 A1 12/2019 Asher et al.
2020/0027185 A1 1/2020 Amaitis et al.
2020/0126344 A1 4/2020 Amaitis et al.

(56) References Cited

U.S. PATENT DOCUMENTS

| | | | |
|---|---|---|---|
| 2020/0134977 | A1 | 4/2020 | Miller |
| 2020/0175820 | A1 | 6/2020 | Miller |
| 2020/0234534 | A1 | 7/2020 | Asher et al. |

FOREIGN PATENT DOCUMENTS

| | | |
|---|---|---|
| CA | 2478180 | 3/2003 |
| CA | 2521159 | 11/2004 |
| CA | 2547447 | 12/2004 |
| EP | 0 217 984 A1 | 4/1987 |
| EP | 0 625 760 A1 | 10/1999 |
| EP | 1 104 686 A1 | 6/2001 |
| EP | 1 288 820 A2 | 3/2003 |
| EP | 1 319 428 A2 | 11/2003 |
| EP | 1 442 773 A2 | 8/2004 |
| EP | 0 848 846 B1 | 12/2006 |
| GB | 1 574 447 | 9/1980 |
| GB | 2 180 675 | 4/1987 |
| GB | 2 299 425 | 10/1996 |
| GB | 2 356 353 | 5/2001 |
| GB | 2 377 055 | 12/2002 |
| GB | 2 380 687 | 4/2003 |
| GB | 2 384 097 | 7/2003 |
| GB | 2 387 009 | 10/2003 |
| GB | 2 388 928 | 11/2003 |
| GB | 2 400 202 | 10/2004 |
| JP | H10-033829 | 7/1996 |
| JP | H9-511593 | 11/1997 |
| JP | 10-320483 | 4/1998 |
| JP | H10-320483 | 12/1998 |
| JP | H11-184937 | 7/1999 |
| JP | 2000-003405 | 1/2000 |
| JP | 2002-215833 | 1/2001 |
| JP | 2001-202467 | 7/2001 |
| JP | 2002-117427 | 4/2002 |
| JP | 2002-177630 | 6/2002 |
| JP | 2002-542916 | 12/2002 |
| JP | 2003-316919 | 3/2003 |
| JP | 2003-529135 | 9/2003 |
| JP | 2003-529142 | 9/2003 |
| JP | 2003-530174 | 10/2003 |
| JP | 2005-513593 | 5/2005 |
| JP | 2008-525900 | 7/2008 |
| NZ | 516935 | 1/2002 |
| NZ | 732480 | 3/2020 |
| NZ | 743914 | 3/2020 |
| WO | WO 1995/022883 | 8/1995 |
| WO | WO 98/004991 A1 | 2/1998 |
| WO | WO 99/01192 A1 | 1/1999 |
| WO | WO 99/30788 | 6/1999 |
| WO | WO 00/00256 A1 | 1/2000 |
| WO | WO 00/22908 A2 | 4/2000 |
| WO | WO 00/67215 A1 | 11/2000 |
| WO | WO 00/79442 A1 | 12/2000 |
| WO | WO 01/65506 | 9/2001 |
| WO | WO 01/65507 A2 | 9/2001 |
| WO | WO 01/65508 A2 | 9/2001 |
| WO | WO 01/68204 A2 | 9/2001 |
| WO | WO 01/64305 A2 | 10/2001 |
| WO | WO 01/73649 A2 | 10/2001 |
| WO | WO 01/77861 A2 | 10/2001 |
| WO | WO 01/77964 A2 | 10/2001 |
| WO | WO 2001/077861 | 10/2001 |
| WO | WO 02/101673 | 12/2002 |
| WO | WO 03/004115 | 1/2003 |
| WO | WO 03/022378 A2 | 3/2003 |
| WO | WO 2003/045520 | 6/2003 |
| WO | WO 2003/046852 A2 | 6/2003 |
| WO | WO 2004/003803 A2 | 1/2004 |
| WO | WO 2005/019986 | 3/2005 |
| WO | WO 05/057339 | 6/2005 |
| WO | WO 05/074617 | 8/2005 |
| WO | WO 05/082478 | 9/2005 |
| WO | WO 2005/086924 | 9/2005 |
| WO | WO 06/017877 | 2/2006 |
| WO | WO 2013/116359 | 8/2013 |

OTHER PUBLICATIONS

Scarne, John, "Scarne's New Complete Guide to Gambling" (excerpt); Simon & Schuster, 1974, pp. 38-42.

Notification of Transmittal of the Internal Search Report and the Written Opinion of the International Searching Authority, dated Oct. 12, 2005, Application No. PCT/US05/03315 (10 pp.).

Notification of Transmittal of the Internal Search Report and the Written Opinion of the International Searching Authority, dated Aug. 12, 2005, Application No. PCT/US05/03292 (10 pp.).

Scarne, John, "Scarne's New Complete Guide to Gambling" (excerpt); Simon & Schuster, 1974, pp. 32-55.

Internet Archive Wayback Machine: "TAB New Zealand's Betting Agency", http://web.archive.org/web/19980623064154/http//www.tab.co.nz/; Jun. 23, 1998 (15 pp.).

Intellectual Property Office of New Zealand Examination Report for Patent Application No. 549700, dated May 23, 2007 (3 pp.).

Intellectual Property Office of New Zealand Examination Report for Patent Application No. 549121, dated May 17, 2007 (2 pp.).

USPTO Office Action for U.S. Appl. No. 10/784,353, dated Jul. 11, 2007 (15 pgs).

Supplementary European Search Report dated Nov. 19, 2007, Application No. EP05712675 (3 pgs).

USPTO Office Action for U.S. Appl. No. 10/771,221, dated Sep. 9, 2005 (9 pgs).

Internet Archive Wayback Machine: "TAB New Zealand's Betting Agency", <http://web.archive.org/web/20031004035004/http://tab.co.nz/>; Oct. 4, 2003 (1 pg.).

Intellectual Property Office of New Zealand Examination Report for Patent Application No. 549116, dated Jul. 31, 2008 (2 pgs.).

USPTO Office Action for U.S. Appl. No. 10/784,353, dated Sep. 5, 2008 (8 pgs).

Wonderland Greyhound Park, "Wonderland Wagering Guide," retrieved from Internet (Aug. 29, 2008) dated Apr. 3, 2002 and Dec. 11, 2002, from Internet URL <http://web.archive.org/web/20021211160142/http://wonderlandgreyhound.com/wagering.html> (9 pgs).

European Patent Office, Office Action for Application No. 05723963.4, dated May 2, 2008 (5 pgs).

European Patent Office, Office Action for Application No. 05712675.7 dated Feb. 21, 2008 (5 pgs).

Intellectual Property Office of New Zealand Examination Report for Patent Application No. 549121, dated Mar. 14, 2008 (2 pp.).

Intellectual Property Office of New Zealand Examination Report for Patent Application No. 549700, dated Mar. 14, 2008 (2 pp.).

"NTRA All-Star Jockey Championship Special Wagers"; 3 pages; date unknown.

"Wagering Information; Straight or Basic Wagers"; Lone Star Park at Grand Prairie: Player's Guide; http://www.lonestarpark.com/bet_info.asp; 3 pages; date unknown.

"Wagering Information; Straight or Basic Wagers"; NTRA.com; http://www.ntra.com/news.asp?type=playthehorses&id=4799; 3 pages; date unknown.

"Glossary of Terms"; NTRA.com; http://www.ntra.com/news.asp?type=playthe horses&id=4797; 3 pages; date unknown.

"The Basics of Horseplay"; NTRA.com; http://www.ntra.com/news.asp ?type= playthehorses&id-4795; 2 pages; date unknown.

*Webster's New Twentieth Century Dictionary of the English Language*; Unabridged; Second Edition; 2 pages; 1978.

New Zealand Patent Application No. 333267 entitled Sporting Event Wagering System; Abandoned by Applicant on Jun. 13, 2000; 2 pages; filed Dec. 9, 1998.

Nags Head Software, Horserace; 3 pages; circa Mar. 15, 2001.

Bet with the People Who Know Racing; Racing Daily Forum; 15 pages; Jul. 24, 2001.

Betting Boolean-Style: A Framework for Trading in Securities Based on Logical Formulas; Lance Fortnow, et al.; 12 pages; Jun. 2003.

(56) References Cited

OTHER PUBLICATIONS

Quote of the Day; Bet of the Day; London Times; 1 page; Jul. 30, 2003.
The Patent Office Search Report for International Application No. GB0320232.2; 6 pages; dated Dec. 17, 2003.
Examination Report for New Zealand Patent Application No. 530448; 1 page; Sep. 17, 2004.
Notification of Transmittal of the International Search Report or the Declaration for International Application No. PCT/US03/26235; 5 pp.; Apr. 13, 2005.
Report of Interview from The Patent Office for Great Britain Application No. GB0320232.2; 3 pages; Sep. 28, 2005.
DICT.org; *The DICT Development Group*; "To back the field"; http://www.dict.org/bin/Dict?Form=Dict2&Database=*&Query.To+back+the=field; 6 pages; Nov. 24, 2005.
Chilliman Chili Parlor—Appetizers; The Chili Parlor; Appetizers; A Day at the Races; http://web.archive.org/web/20010305124432/http://chilliman.com/ chiliparlor_appetizers.htm; 10 pages; Nov. 25, 2005.
New Zealand Racing Board; Opposition to New Zealand Patent Application No. 530448 in the Name of Cantor Index LLC; Statement of Case; 12 pages; Nov. 28, 2005.
Letters Patent for New Zealand Patent No. 530448; 1 page; Mar. 16, 2006.
Examination Report from the Patent Office for Great Britain Application No. GB0320232.2; 7 pages; dated May 11, 2006.
Examination Report for New Zealand Patent Application No. 539209; 2 pages; May 24, 2006.
Examination Report for New Zealand Patent Application No. 547179; 2 pages; May 24, 2006.
Office Action from the Patent Office for Great Britain Application No. GB0320232.2; 3 pages; dated Dec. 6, 2006.
European Search Report for Application No. 03816823.3-1238; 3 pages; dated Apr. 17, 2007.
Notification of Transmittal of the International Search Report and the Written Opinion of the International Searching Authority, or the Declaration for International Application No. PCT/US05/47027; 8 pages; Apr. 26, 2007.
United States Patent and Trademark Office; Notice of Allowance and Fee(s) Due for U.S. Appl. No. 11/022,394, filed Dec. 22, 2004 in the name of Lee M. Amaitis; 7 pages; dated Aug. 10, 2007.
Pending U.S. Appl. No. 11/928,939 entitled System and Method for Betting on a Subset of Participants in an Event by Lee M. Amaitis, et al.; filed Oct. 30, 2007.
Pending U.S. Appl. No. 11/928,649 entitled ystem and Method for Betting on a Subset of Participants in an Event Wherein Betting Parameters May Change Over Time; by Lee M. Amaitis, et al.; filed Oct. 30, 2007.
European Patent Office Examination Report for Application No. 03 816 823.3-1238; 4 pages; dated Nov. 19, 2007.
Anthony LeMaire; Horse Racing Betting Odds; http://ezinearticles.com;/?Horse-Racing-Betting-Odds&id = 125666; 1 page; retrieved Jan. 4, 2008.
Notification of Transmittal of the International Search Report and the Written Opinion of the International Searching Authority for International Application No. PCT/US06/08695; 9 pages; dated Mar. 24, 2008.
Intellectual Property Office of New Zealand; Examination Report for Application No. 539209; 4 pages; dated Jul. 31, 2008.
Intellectual Property Office of New Zealand; Examination Report for Patent Application No. 547179; 4 pages; Aug. 28, 2008.
Intellectual Property Office of New Zealand; Examination Report for Patent Application No. 539209; 1 page; dated Sep. 4, 2008.
PCT Search report and Written Opinion for International Application No. PCT/US06/28140; 8 pages; dated Feb. 20, 2007.
Amended Notice of Opposition for NZ Patent Application No. 549121; 4 pages; Mar. 3, 2009.
New Zealand Racing Board, TAB How to Play—Types of Races, "How to Play" [online]. [retrieved Sep. 9, 2009]. Retrieved from the Internet: < URL: http://web.archive.org/web/19980623064856/www.tab.co.nz/4_how_to_play/4_f_how_to.html>.
The Thoroughbred Times, "Magna Institutes pick five wager" [online]. Jan. 15, 2004. [retrieved Mar. 24, 2009]. Retrieved from the Internet: < URL: http://www.thoroughbredtimes.com/national-news/2004/Jan./15/magna-institutes-pick-five-wager.aspx>.
Majorwager.com, "Magna Pick 5 Fails to make $500K Poop-MajorWager Forums" [online]. Jan. 31, 2004. [retrieved Mar. 24, 2009]. Retrieved from the Internet: < URL: http://www.majorwager.com/forums/race-track/139617-magna-pick-5-fails-make-500k-pool.html>.
The Los Angeles Times, "Magna 5 might be the Ticket" [online]. Jan. 31, 2004. [retrieved Mar. 24, 2009]. Retrieved from the Internet: < URL: http://articles.latimes.com/2004/jan/31/sports/sp-insider31>.
Bloodhorse.com, "Magna Pick 5 Handle Tops $600,000", by Blood Horse Staff [online]. Feb. 22, 2004. [retrieved Mar. 24, 2009]. Retrieved from the Internet: < URL: http://www.bloodhorse.com/articleindex/article.asp?id=20819>.
New Zealand Racing Board, "Your Multi Tab" Brochure, [online]. [retrieved Mar. 24, 2009]. Retrieved from the Internet: < URL: http:web.archive.org/web/20031219010102/www.tab.co.nz/Multi/tab-multi-brochure.pdf>.
California Regulatory Notice Register, Title 4. California Horse Racing Board, [online]. Aug. 29, 2003. [retrieved Mar. 24, 2009]. Retrieved from the Internet: < URL: http://www.oal.ca.gov/res/docs/pdf/notice/35z-2003.pdf>.
European Search Report for Application No. 05712661.7; 3 pages; dated Aug. 11, 2009.
Invendium Ltd., Online Betting Guide (OLBG) Betting School, 2202-2009, retrieved from Internet www.online-betting-guide.co.uk on May 19, 2009 from URL<http://www.online-betting-guide.co.uk/school/horse_racing_bets.php>.; 5 pages.
Beyer, Andrew, the Winning Horseplayer, 1994, 138-139.
Intellectual Property Office of New Zealand Examination Report for Patent Application No. 565411, dated Oct. 23, 2009 (3 pgs.).
AU Examiners Report for AU Application No. 2006276086; 4 pages; dated Aug. 7, 2009.
Notice of Allowance for U.S. Appl. No. 11/190,613; 29 pages; dated Jan. 11, 2010.
New Zealand Notice of Acceptance dated Jun. 17, 2010 and Examination Report dated May 19, 2010 for Nz Application No. 572658; 3 pages.
New Zealand Examination Report for Patent Application No. 572658 dated Nov. 13, 2008; 2 pages.
AU Examiners Report for AU Application No. 2005318970; 1 page; dated Jun. 24, 2010.
Translation of JP Office Action for JP Application No. 2006-552226 dated Jul. 27, 2010; 4 pages.
Translation of JP Office Action for JP Application No. 2006-552223 dated Jul. 27, 2010; 4 pages.
AU Examiners Report for AU Application No. 2006220536; dated Sep. 29, 2010; 3 pages.
NZ Examination Report for Application No. 556076; dated Dec. 17, 2010 2 pages.
JP Office Action for Application No. 2007-548577 dated Jan. 4, 2011; 6 pages (includes English Translation).
Notice of Acceptance for AU Application No. 2005216980 dated Mar. 16, 2011; 3 pages.
Notice of Acceptance for AU Application No. 2006276086 dated Mar. 31, 2011; 3 pages.
NZ Examination Report for Application No. 592115; dated Apr. 12, 2011; 2 pages.
EP Search Report for Application No. 05855562.4 dated May 24, 2011; 7 pages.
JP Office Action for Application No. 2008-500985 dated Jun. 7, 2011; 12 pages (includes English Translation).
JP Office Action for Application No. 2007-548577 dated Aug. 2, 2011; 8 pages (includes English Translation).
CA Office Action for Application No. 2616157; 4 pages; dated Aug. 29, 2011.
NZ Examination Report for Application No. 594811; dated Aug. 29, 2011; 3 pages.

(56) References Cited

OTHER PUBLICATIONS

NZ Examination Report for Application No. 594872; 2 pages; dated Sep. 1, 2011.
EP Extended Search Report for Application No. 06800146.0; dated Mar. 29, 2012; 6 pages.
Notice of Acceptance for AU Application No. 2005318970; 3 pages; dated Mar. 27, 2012.
JP Office Action for Application No. 2008-500985 dated Apr. 24, 2012; 6 pages (includes English Translation).
European Decision to Refuse a European Patent Application for Application No. 05712675.7; dated Sep. 17, 2012 (12 pgs).
AU Examiners Report for AU Application No. 2011203086; dated Mar. 21, 2012; 2 pages.
EP Office Action for Application No. 05855562.4 dated Mar. 14, 2012; 5 pages.
NZ Examination Report, dated Oct. 9, 2012 for New Zealand App'l No. 602822; 2 pages.
NZ Notice of Acceptance for Application No. 592115; dated Oct. 9, 2012; 1 page.
CA Office Action, dated Jul. 5, 2012 for Canadian App'l No. 2,599,952; 4 pages.
EP Extended Search Report for Application No. 06737833.1 dated Mar. 29, 2012; 6 pages.
CA Office Action for Application No. 2521159; 2 pages; dated Jun. 27, 2012.
NZ Examination Report for Application No. 592189; dated Oct. 12, 2012 2 pages.
NZ Examination Report and Notice of Acceptance for Application No. 592189; dated Nov. 6, 2012 2 pages.
NZ Examination Report for Application No. 594872; dated Feb. 27, 2013; 2 pages.
NZ Notice of Acceptance for Application No. 594872; dated Mar. 11, 2013; 1 page.
NZ Examination Report for Application No. 607500; dated Feb. 27, 2013; 2 pages.
CA Examiner's Report for Application No. 2,592,038; dated Feb. 7, 2013; 3 pages.
NZ Notice of Acceptance for Application No. 594811; dated Jan. 28, 2013; 1 page.
NZ Examination Report for Application No. 605849; dated Jan. 18, 2013; 2 pages.
AU Examination Report for Application No. 2011203580; dated Feb. 19, 2013; 3 pages.
EP Communication for EP App. No. 05855562.4; dated Mar. 28, 2013; 7 pages.
JP Office Action for JP App. No. 2012-158666; dated Jul. 9, 2013; 9 pages (w/English translation).
CA Examiner's Report for CA App. No. 2,599,952; dated Mar. 28, 2013; 4 pages.
EP Communication for EP App. No. 06737833.1; dated Jun. 4, 2013; 6 pages.
CA Examiner's Report for CA App. No. 2,521,159; dated Apr. 3, 2013; 2 pages.
JP Office Action for JP App. No. 2013-7077; dated Jul. 30, 2013; 8 pages (w/English translation).
AU Patent Examination Report for AU App. No. 2012201633; dated Sep. 25, 2013; 3 pages.
AU Patent Examination Report for AU App. No. 2011205156; dated Oct. 1, 2013; 2 pages.
AU Patent Examination Report for AU App. No. 2012203799; dated Nov. 29, 2013; 4 pages.
EP Communication Pursuant to Article 94(3) EPC for App. No. 06800146.0; dated Nov. 12, 2013; 5 pages.
CA Examination Report for CA App. No. 2,522,236; dated Feb. 12, 2014; 5 pages.
JP Office Action for App. No. 2013-086561; dated Apr. 22, 2014; 6 pages (w/English translation).
AU Examination Report for App. No. 2011211332; dated Mar. 5, 2014; 4 pages.
NZ Examination Report for App. No. 623711; dated Apr. 16, 2014; 2 pages.
CA Examination Report for CA App. No. 2,616,157; dated Jun. 4, 2014; 3 pages.
Canadian Examiner's Requisition for App. No. 2,592,038; dated Sep. 30, 2014; 4 pages.
Canadian Examiner's Requisition for App. No. 2,599,952; dated Dec. 8, 2014; 6 pages.
NZ First Examination Report for App. No. 627644; dated Jul. 29, 2014; 2 pages.
Canadian Examiner's Requisition for App. No. 2,521,159; dated Jan. 9, 2015; 5 pages.
NZ First Examination Report for App. No. 629452; dated Aug. 27, 2014; 2 pages.
AU Patent Examination Report No. 1 for App. No. 2013209388; dated Aug. 14, 2014; 2 pages.
Notification of Transmittal of the International Search Report and the Written Opinion of the International Searching Authority for International Application No. PCT/US2013/023880 dated Jun. 17, 2013 (15 pages).
AU Patent Examination Report No. 1 for App. No. 2013231139; dated May 25, 2015; 2 pages.
JP Office Action for App. No. 2013-7077; dated Apr. 7, 2015; 10 pages (w/English translation).
JP Office Action for App. No. 2013-086561; dated Mar. 24, 2015; 8 pages (w/English translation).
CA Examiners Requisition for App. No. 2,522,236; dated Apr. 7, 2015; 6 pages.
CA Examiners Requisition for App. No. 2,616,157; dated May 8, 2015; 4 pages.
EP Summons to Attend Oral Proceedings for App. No. 06800146.0; Feb. 17, 2015; 4 pages.
JP Office Action for App. No. 2015-053538 ; dated Mar. 22, 2016; 14 pages (w/English translation).
AU First Examination Report for App. No. 2015203598; dated Jun. 28, 2016; 3 pages.
AU First Examination Report for App. No. 2015218414; dated Sep. 6, 2016; 3 pages.
CA Examiners Report for App. No. 2522236; dated Sep. 20, 2016; 6 pages.
AU First Examination Report for App. No. 2015203414; dated Nov. 3, 2016; 3 pages.
CA Examiners Report for App. No. 2521159; dated Nov. 17, 2016; 6 pages.
JP Notice of Allowance for App. No. 2015-053538 ; dated Nov. 22, 2016; 3 pages.
AU First Examination Report for App. No. 2015264800; dated Nov. 29, 2016; 2 pages.
NZ Notice of Acceptance for App. No. 713379; dated Mar. 31, 2017; 1 page.
NZ First Examination Report for App. No. 730158; dated Mar. 30, 2017; 2 pages.
CA Examiners Report for App. No. 2592038; dated Dec. 28, 2016; 6 pages.
JP Office Action for App. No. 2013-086561 ; dated Apr. 18, 2017; 8 pages.
AU SecondExamination Report for App. No. 2015210464; dated May 16, 2017; 3 pages.
CA Examiners Report for App. No. 2616157; dated May 19, 2017; 6 pages.
AU Notice of Acceptance for App. No. 2015210464; dated Jun. 8, 2017; 3 pages.
EP Search Report for Application No. 05855562.4 dated Feb. 25, 2016; 4 pages.
Canadian Examiner's Requisition for App. No. 2,599,952; dated Nov. 17, 2016; 6 pages.
NZ Examination Report for App. No. 717453; dated Mar. 2, 2016; 1 page.
AU Examination Report for App. no. 2014262267 ; dated Jan. 13, 2016; 2 pages.
CA Examiners Report for App. No. 2616157; dated Jun. 8, 2016; 6 pages.

(56) References Cited

OTHER PUBLICATIONS

NZ Examination Report for App. No. 713379; dated Nov. 4, 2015; 2 pages.
AU First Examination Report for App. No. 2015203598; dated Jun. 19, 2017; 3 pages.
AU First Examination Report for App. No. 2016203277; dated Jun. 27, 2017; 3 pages.
NZ Examination Report for App. No. 732480; dated Jul. 4, 2017; 1 page.
AU First Examination Report for App. No. 2015218414; dated Aug. 17, 2017; 3 pages.
AU Second Examination Report for App. No. 2015203414; dated Oct. 13, 2017; 5 pages.
Canadian Examiner's Requisition for App. No. 2,599,952; dated Oct. 23, 2017; 6 pages.
Canadian Examiner's Requisition for App. No. 2521159; dated Oct. 25, 2017; 6 pages.
AU First Examination Report for App. No. 2015264800; dated Oct. 19, 2017; 3 pages.
Canadian Final Action App. No. 2,522,236; dated Sep. 18, 2017; 8 pages.
CA Examiners Report for App. No. 2592038; dated Nov. 23, 2015; 7 pages.
Canadian Examiner's Requisition for App. No. 2,599,952; dated Jan. 13, 2016; 5 pages.
EP Communication for EP App. No. 06737833.1; dated Sep. 20, 2017; 7 pages.
AU Examination Report for App. No. 2015210464; dated Jun. 9, 2016; 2 pages.
NZ Notice of Acceptance for App. No. 717453; dated Feb. 21, 2018; 1 page.
AU Examination Report for App. No. 2016273964; dated Feb. 26, 2018; 2 pages.
Canadian Examiner's Requisition for App. No. 2,592,038; dated Mar. 8, 2018; 8 pages.
EP Decision to Refuse for App. No. 06737833.1; dated Apr. 24, 2018; 2 pages.
Canadian Examiner's Requisition for App. No. 2,616,157; dated Apr. 30, 2018; 5 pages.
Canadian Patent Appeal Board Notice for App. No. 2,522,236; Jun. 1, 2018; 6 pages.
AU Examination Report for App. No. 2017204335; dated Aug. 1, 2018; 3 pages.
NZ Examination Report for App. No. 743914; dated Jul. 19, 2018; 2 pages.
AU First Examination Report for App. No. 2017218984; dated Oct. 12, 2018; 2 pages.
Canadian Patent Appeal Board Notice for App. No. 2592038; Oct. 30, 2018; 6 pages.
AU Examination Report for App. No. 2017232095; dated Sep. 26, 2018; 2 pages.
NZ Examination Report for App. No. 743914; dated Jan. 24, 2019; 4 pages.
AU Examination Report for App. No. 2017265568; dated Feb. 4, 2019; 3 pages.

* cited by examiner

| EVENT SELECT BET AND RESULT DATA | | | | | | |
|---|---|---|---|---|---|---|
| TRACK | RACE | BETTOR 1 | BETTOR 2 | BETTOR 3 | BETTOR 4 | RACE WINNERS |
| 1 | 1 | | | HORSE #5 | | HORSE #1 |
| 1 | 2 | HORSE #3 | | | | HORSE #3 |
| 1 | 3 | | | | | HORSE #5 |
| 1 | 4 | | | | | HORSE #9 |
| 1 | 5 | HORSE #8 | | | | HORSE #8 |
| 2 | 1 | | HORSE #1 | HORSE #9 | | HORSE #1 |
| 2 | 2 | | HORSE #1 | | | HORSE #1 |
| 2 | 3 | HORSE #3 | HORSE #7 | | | HORSE #7 |
| 2 | 4 | | HORSE #6 | | | HORSE #6 |
| 2 | 5 | | HORSE #3 | HORSE #8 | | HORSE #3 |
| 3 | 1 | HORSE #3 | HORSE #3 | HORSE #2 | HORSE #3 | HORSE #3 |
| 3 | 2 | HORSE #3 | | | | HORSE #3 |
| 3 | 3 | | | | HORSE #6 | HORSE #6 |
| 3 | 4 | | | HORSE #3 | | HORSE #1 |
| 3 | 5 | | | | HORSE #7 | HORSE #7 |
| 4 | 1 | | | | | HORSE #6 |
| 4 | 2 | | | HORSE #3 | HORSE #6 | HORSE #6 |
| 4 | 3 | HORSE #4 | | | | HORSE #4 |
| 4 | 4 | | | | HORSE #7 | HORSE #7 |
| 4 | 5 | | | | HORSE #4 | HORSE #4 |
| EVENT SELECT WINNER? | | NO | YES | NO | YES | |

*FIG. 2A*

| EVENT SELECT BET AND RESULT DATA | | | | | |
|---|---|---|---|---|---|
| EVENT | BETTOR 1 | BETTOR 2 | BETTOR 3 | BETTOR 4 | WINNING PARTICIPANT |
| GAME 1 | TEAM A | | TEAM B | TEAM B | TEAM A |
| GAME 2 | | | TEAM A | TEAM A | TEAM A |
| GAME 3 | TEAM B | TEAM B | | TEAM A | TEAM B |
| GAME 4 | TEAM A | TEAM A | | TEAM B | TEAM A |
| GAME 5 | | TEAM A | TEAM B | TEAM B | TEAM A |
| GAME 6 | TEAM B | | | | TEAM B |
| GAME 7 | | TEAM B | | | TEAM B |
| GAME 8 | | TEAM B | TEAM B | | TEAM B |
| GAME 9 | TEAM B | | TEAM A | | TEAM B |
| GAME 10 | | | | | TEAM A |
| RACE 1 | | | | | HORSE #5 |
| RACE 2 | | | HORSE #2 | | HORSE #2 |
| RACE 3 | HORSE #1 | | | | HORSE #2 |
| RACE 4 | | | HORSE #3 | | HORSE #3 |
| RACE 5 | HORSE #1 | HORSE #8 | | HORSE #7 | HORSE #8 |
| RACE 6 | | HORSE #6 | | | HORSE #6 |
| RACE 7 | | HORSE #3 | | | HORSE #3 |
| RACE 8 | HORSE #1 | | HORSE #4 | HORSE #3 | HORSE #4 |
| RACE 9 | | | | HORSE #3 | HORSE #3 |
| RACE 10 | | | | | HORSE #1 |

*FIG. 2B*

FIG. 3

100 EVENT SELECT OFFERING POOL = EVENT SELECT BETS RECEIVED

102 EVENT SELECT OFFERING TAKE-OUT = COMMISSION RATE * EVENT SELECT OFFERING POOL

104 EVENT SELECT OFFERING PAYOUT = EVENT SELECT OFFERING POOL - EVENT SELECT OFFERING TAKE-OUT + EVENT SELECT CARRYOVER

| EVENT SELECT BET AND RESULT DATA | | | | | |
|---|---|---|---|---|---|
| EVENT | BETTOR 1 | BETTOR 2 | BETTOR 3 | BETTOR 4 | WINNING PARTICIPANT (ODDS) |
| RACE 1 | | HORSE #5 | HORSE #5 | | HORSE #5 (15-1) |
| RACE 2 | HORSE #8 | | HORSE #6 | | HORSE #6 (3-1) |
| RACE 3 | | HORSE #8 | | HORSE #8 | HORSE #8 (12-1) |
| RACE 4 | HORSE #6 | HORSE #1 | | HORSE #1 | HORSE #1 (10-1) |
| RACE 5 | | | | HORSE #2 | HORSE #1 (9-5) |
| RACE 6 | HORSE #1 | | HORSE #3 | HORSE #2 | HORSE #3 (3-2) |
| RACE 7 | HORSE #2 | | | HORSE #2 | HORSE #2 (15-1) |
| RACE 8 | HORSE #6 | HORSE #6 | | | HORSE #6 (20-1) |
| RACE 9 | | HORSE #5 | HORSE #5 | | HORSE #5 (11-1) |
| RACE 10 | | | HORSE #7 | | HORSE #7 (5-2) |
| KENTUCKY DERBY | HORSE #10 | HORSE #1 | HORSE #2 | HORSE #7 | HORSE #2 |
| BET AMOUNT | $1.00 | $5.00 | $2.00 | $1.00 | |

FIG. 4

MANAGING BETS THAT SELECT EVENTS AND PARTICIPANTS

CROSS-REFERENCE TO RELATED APPLICATIONS

This patent application is a continuation of U.S. patent application Ser. No. 16/272,021 filed on Feb. 11, 2019 which is a continuation application of U.S. patent application Ser. No. 14/816,562, filed Aug. 3, 2015 (now U.S. Pat. No. 10,229,553 issued on Mar. 12, 2019) which is a continuation of U.S. patent application Ser. No. 10/771,076 filed Feb. 3, 2004 (now U.S. Pat. No. 9,098,883 issued on Aug. 4, 2015), the disclosures of which are hereby incorporated by reference herein in their entireties.

TECHNICAL FIELD OF THE INVENTION

This invention relates in general to wagering and, more particularly, to wagering on selected events.

BACKGROUND OF THE INVENTION

Wagering on sporting events, such as horse races, for example, is a large and growing industry in many parts of the world. Various types of betting products and systems are available for various types of sporting events For example, many horse racing tracks provide one or more "Daily Double" bets in which a bettor may bet on the winners of two consecutive races chosen by the track (e.g., the first two or last two races of the day). Some tracks also provide a "Pick Three," where bettors select the winners of three consecutive races chosen by the track, a "Pick Four," where bettors select the winners of four consecutive races chosen by the track, and/or a "Pick Six," where bettors select the winners of six consecutive races chosen by the track.

SUMMARY OF THE INVENTION

According to one embodiment, a method of managing bets is provided. The method includes receiving one or more bets. Each bet comprises a selection of a first number of events selected from a group of events, a selection of a respective participant for each of the first number of events selected and a bet amount. The method also includes combining each bet amount to form a betting pool and determining an amount of a total payout based at least in part on the betting pool.

The method may also include receiving results of the group of events. The results may identify a winning participant for each event of the group of events. The method may include determining one or more winning bets of the one or more bets based on the results. Determining one or more winning bets may comprise determining for each of the one or more bets if each selected respective participant corresponds to the winning participant for each of the first number of events selected in the bet. A bet of the one or more bets may comprise a winning bet if each selected respective participant corresponds to the winning participant for each of the first number of events selected in the bet, or if at least some of the selected respective participants correspond to a winning participant for each of the first number of events selected and the bet of the one or more bets includes a winning participant of a specified event. A bet of the one or more bets may also comprise a winning bet if at least some of the selected respective participants correspond to a winning participant for each of the first number of events selected and the bet amount is at least as high as a specified amount. A bet of the one or more bets may also comprise a winning bet if at least some of the selected respective participants correspond to a winning participant for each of the first number of events selected and the selected respective participants of the bet comprise participants having specified odds.

The method may also include determining an amount to be paid for each winning bet based on the number of winning bets, the amount of the total payout, the bet amount of each winning bet and the odds of the selected respective participants of each winning bet. The method may also include increasing a payout for a first winning bet of the one or more winning bets if the first winning bet's selected respective participants for each of the first number of events selected each had specified odds or if at least one of the first winning bet's selected events comprises a specified event. Determining an amount of a total payout based at least in part on the betting pool may comprise applying a commission rate to the betting pool and adding to the betting pool a carryover amount from a previous betting pool. The first number of events may comprise horse racing events held at different tracks and/or on different days. The first number of events may also comprise one or more dog racing, basketball, football, baseball, hockey, soccer, jai-alai, golf, boxing, rugby, cricket, auto racing, bicycle racing, tennis, Olympic or other sporting events, political events and/or entertainment events.

According to another embodiment, a system for managing bets includes a memory operable to store one or more bets. Each bet comprises a selection of a first number of events selected from a group of events, a selection of a respective participant for each of the first number of events selected and a bet amount. The system includes a processor coupled to the memory. The processor is operable to combine each bet amount to form a betting pool and determine an amount of a total payout based at least in part on the betting pool. The processor may also be operable to receive results of the group of events. The results may identify a winning participant for each event of the group of events. The processor may be operable to determine one or more winning bets of the one or more bets based on the results.

A processor operable to determine one or more winning bets may comprise a processor operable to determine for each of the one or more bets if each selected respective participant corresponds to the winning participant for each of the first number of events selected in the bet. The processor may be further operable to determine an amount to be paid for each winning bet based on the number of winning bets, the amount of the total payout, the bet amount of each winning bet and the odds of the selected respective participants of each winning bet. The processor may be operable to increase a payout for a first winning bet of the one or more winning bets if the first winning bet's selected respective participants for each of the first number of events selected each had specified odds or if at least one of the first winning bet's selected events comprises a specified event.

Various embodiments of the present invention may benefit from numerous advantages. It should be noted that one or more embodiments may benefit from some, none, or all of the advantages discussed below.

One advantage of particular embodiments is that bettors are given the opportunity to select a certain number of events out of a group of events and to bet on each event selected, with all such bets going to a pool for distribution to winners of such bets. Thus, a bettor may select events that the bettor feels he has the best chance to correctly pick the winners.

Moreover, if a bettor misses one of his selected events and there are still enough other events that have not yet taken place to place another bet, the bettor can re-enter the pool by placing an additional bet selecting more events. Another advantage of the invention is that certain incentives may be given to bettors selecting certain specified events or participants having certain specified odds in their bets. For example, a bet may earn a greater payout of the betting pool if it correctly includes a winner of a certain specified event or if it includes longshot participants that win their events. Moreover, bettors may be allowed to miss some picks if they correctly select a certain specified event or longshot participants that win their events.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 2A and 2B illustrate example Event Select bet and result data which may be determined by a betting system platform and communicated to bettors, in accordance with an embodiment of the present invention;

FIG. 3 illustrates various equations for calculating potential Event Select offering payouts, in accordance with an embodiment of the present invention;

FIG. 4 illustrates additional example Event Select bet and result data which may be determined by a betting system platform and communicated to bettors, in accordance with an embodiment of the present invention.

DETAILED DESCRIPTION OF EXAMPLE EMBODIMENTS OF THE INVENTION

Figure 1:
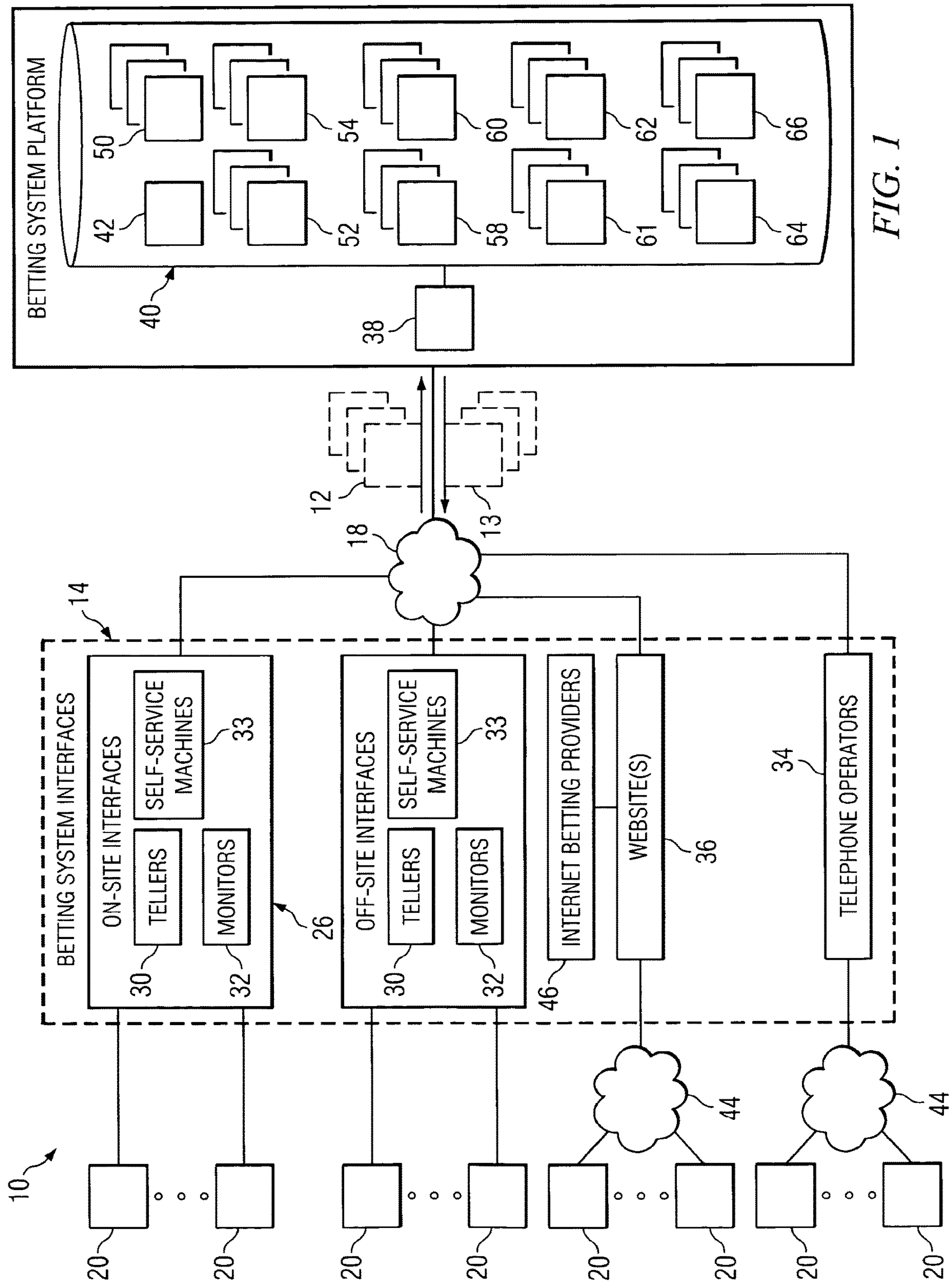
FIG. 1 illustrates a system for receiving and managing Event Select bets, in accordance with an embodiment of the present invention.

FIG. 1 illustrates an example system 10 for receiving and managing bets 12 in accordance with an embodiment of the present invention. System 10 includes one or more betting system interfaces 14 and a betting system platform 16 coupled by one or more communications networks 18. In general, one or more bettors 20 may receive bet offering information (such as event times, betting rules, betting options and odds, for example) and/or place bets 12 via betting system interfaces 14. Betting system interfaces 14 communicate such bets 12 received from bettors 20 to betting system platform 16. Betting system platform 16 stores the received bets 12, determines appropriate odds and payouts, and communicates such odds and payouts to one or more of the betting system interfaces 14.

In a given time period, such as one or more particular hours or days, a number of events upon which bets may be placed may be scheduled to take place. For example, in a particular day a number of horse races may be scheduled at one or more tracks. As another example, a number of professional football games may be scheduled for a particular Sunday. As an additional example, a number of first round basketball games of a collegiate basketball tournament may be scheduled for a particular two days. System 10 permits bettors 20 to select a certain number of events out of those scheduled to take place in a given time period and to bet on the winners of the events selected. Such a bet may be referred to as an "Event Select" bet or an "Event Choice" bet, and bets 12 may be referred to herein as Event Select bets 12 or Event Choice bets 12.

In particular embodiments, the number of events that a bettor 20 must select on which to bet may be designated by betting system platform 16. A set of events from which bettors 20 must select on which to bet may also be designated. The set of events may include any number of events of various types and/or sports, such as horse racing, dog racing, basketball, football, baseball, hockey, soccer, jai-alai, golf, boxing, rugby, cricket, auto racing, bicycle racing, tennis, Olympic events or any other suitable type of event, and may include events of different types. The set of events may also include non-sporting events, such as political events (e.g., elections) and entertainment events (e.g., Academy Awards and movie box office revenue predictions). The set of events for selection may also include events occurring in different areas, such as different time zones or different countries. The designation of a group of events from which a bettor 20 must select on which to bet in a particular Event Select bet 12, the number of events that the bettor must select and other suitable information (such as required betting amount and winning payout rules or information) may be included in Event Select offerings 13 communicated to bettors 20 through betting system interfaces 14.

As an example, an Event Select offering 13 may be provided at betting system platform 16 for betting by bettors 20 that requires selection of six horse races out of a designated set of horse races and selection of a winning horse for each respectively selected race. Thus, in this example bettors 20 would place Event Select bets 12 in response to the Event Select offering 13. The set of races from which six races must be selected may include races scheduled to be run at one or more race tracks. Different bettors 20 may choose different races to constitute their selected six races of their respective Event Select bets. For example, if the bet allows bettors 20 to choose from races being held at Track A, Track B and Track C, and each such track is scheduled to run nine races on a particular day designated in the Event Select offering 13, then one bettor 20 may select Race 2 from Track A, Races 3, 4, and 6 from Track B and Races 7 and 9 from Track C, while another bettor 20 may select Races 4, 5, 6, 7, 8 and 9 from Track C. Each such bettor 20 will also select a winning participant for each race chosen. In the example given, a winning Event Select bet 12 may constitute one that correctly selects the winning participant of each of the six races selected by the bettor in the bettor's Event Select bet. It is possible that multiple bettors may win the Event Select offering, and those winners may have selected different races on which to bet in their respective Event Select bets.

It should be understood that a winning participant of an event for purposes of an Event Select bet may be the participant that wins an event outright (e.g., a team that scores more points than an opposing team or a horse that finishes first in a race) or a particular participant according to another method, such as according to the participant ahead after a point spread is accounted for in the event outcome. In particular embodiments, a particular Event Select offering may indicate that bettors 20 must select outright winning participants or point spread winning participants of their respectively selected events in their Event Select bets.

In particular embodiments, Event Select bets 12 corresponding to an Event Select offering 13 may include selection of non-winning participants instead of, or in addition to, selection of winning participants. For example, some Event Select offerings 13 may require selection of second, third or last place finishers in selected events instead of, or in addition to, selection of winning participants. Thus, Event Select offerings of particular embodiments may require selection of any particular designated results of the events selected by the bettor.

System 10 may be a pari-mutuel betting system in which all Event Select bets 12 received corresponding to an Event Select offering 13 are pooled, a commission (or "take-out") is taken by the wager provider or host, and the remainder is distributed among the winning bettors. Thus, each Event Select offering may have its own such pari-mutuel pool. For example, a plurality of Event Select offerings 13 may be offered for betting by bettors 20 at any particular time. Such Event Select offerings may include, for example: (1) Select five professional football games among those scheduled for a particular Sunday, (2) Select eight horse races among those scheduled for five designated tracks for a particular day, (3) Select two baseball games and three basketball games among those scheduled for a particular day, (4) Select seven college basketball games among those scheduled for a particular two days, or (5) Select five events among all professional basketball and football games being held on a particular weekend. These are mere examples of various types of Event Select offerings 13 upon which bettors 20 may place Event Select bets 12. As discussed, Event Select offerings 13 may designate any number of events scheduled to take place at any number of locations at any particular time period. A bettor's corresponding Event Select bet 12 for a particular offering will include a selection of the designated number of events and a winning participant for each respectively selected event. All Event Select bets 12 received for a particular Event Select offering may be pooled, and the winning bets 12 for such offering may each receive a portion of the pari-mutuel pool after any applicable commission is taken out by the wager provider or host. In particular embodiments, pools for bets received for different Event Select offerings may be combined to constitute a larger pool for multiple Event Select offerings.

In some embodiments, an Event Select offering provider may guarantee a certain total Event Select offering payout even if total bet amounts received for the offering are not enough to provide the guaranteed payout. If enough bet amounts are not received for the offering to provide for a guaranteed payout, the wagering provider could contribute extra amounts to provide the guaranteed payout, for example from its own funds or through purchased insurance.

A bettor 20 may place an Event Select bet 12 at a betting system interface 14 up until the point when there are fewer events remaining than the number of events required for selection to place the Event Select bet 12. For example, if a particular Event Select offering 13 requires selection of six events among a group of fifteen events scheduled, then an Event Select bet may be placed at anytime before betting has closed for the final six events of those fifteen events. To elaborate further, a particular Event Select offering 13 may require selection of six races out of a total of thirty-six races being held at four tracks (e.g., nine races at each track). For purposes of this example, assume that all races at one track (e.g., Track 1) are scheduled to take place after all races of the other three tracks (e.g., Tracks 2, 3 and 4) have taken place. This may occur for any number of reasons, such some races offered for selection being scheduled at night instead of in the day or on different days or tracks being located in different time zones. In this example, if a bettor waits until after Race 3 at Track 1 to place his Event Select bet, then the bettor must select the winners of Races 4, 5, 6, 7, 8 and 9 of Track 1 in the bettor's Event Select bet (all of the other possible races will have taken place). This enables bettors who may have selected earlier events in a particular Event Select bet and missed selecting the winning participants of any of those events to place one or more additional Event Select bets encompassing the required number of remaining events. Thus, such bettors still have a chance to win a portion of that particular Event Select offering's pari-mutuel payout.

It is possible that a particular Event Select offering may not have any Event Select bets that correctly select the winners of the bets' respectively selected events. In those cases, some or all of the Event Select offering payout for that Event Select offering may be paid to Event Select bettors who correctly select the most of their respectively selected events (e.g., some or all of an Event Select offering payout may be split among bettors correctly selecting five out of six respectively selected events). In some cases, no payout may be made for a particular Event Select offering if no bettor correctly picks the winners of all of the bettor's selected events.

In particular embodiments, in the event that any payout is made to a plurality of Event Select bettors picking the same number of events correctly, the payout may be divided among such Event Select bettors according to dollars wagered by each such bettor. For example, if two Event Select bettors correctly select the winners of all events respectively selected and one such bettor wagered 1 for his winning Event Select bet while the other Event Select bettor wagered 2 for his winning Event Select bet, then the Event Select bettor that wagered 2 may receive twice the amount of the Event Select offering payout received by the bettor that wagered $1.

Any portion of a particular Event Select offering payout not paid to any bettor (e.g., if there are no Event Select bets that correctly pick the winners of all respectively selected events and the full Event Select bet payout is not distributed to bettors correctly picking less than all respectively selected events) may carry over to a future Event Select offering to be combined with the Event Select bets placed for such offering to constitute the future Event Select offering's payout. As an example, if an Event Select offering requires selection of ten professional football games occurring on a particular Sunday and the respectively selected games' winning teams and no Event Select bet accurate picks the winning teams of each selected game, then that particular Event Select offering payout may carry over to a similar Event Select offering occurring on the following Sunday. Event Select offering payouts may carry over multiple times (e.g., over multiple Event Select offerings) if some or all of the multiple offerings' payouts are not paid. In some embodiments, in the event that no Event Select bettors for a particular Event Select offering correctly select the winners of all selected events but a portion of that offering's payout is paid (e.g., to those correctly selecting some selected events), then such portion may not include any Event Select bet amounts carried over from a previous Event Select offering. This would ensure that any carryover Event Select bet amounts would only be paid to those bettors who correctly select the winning participants in all of their respectively selected events.

Betting system interfaces 14 may include any suitable interface between a bettor 20 and betting system platform 16. For example, as shown in FIG. 1, betting system interfaces 14 may include physical interfaces, such as on-site interfaces 26 and/or off-site interfaces 28. On-site interfaces 26 are generally located at sites where events take place, such as a race track, while off-site interfaces 28 are located at a site away from where events take place, such as an off-track-betting (OTB) parlor or a casino. On-site interfaces 26 and off-site interfaces 28 may include tellers 30, which may receive bets 12 from and distribute payouts to bettors 20, and/or monitors 32, which may be viewed by bettors 20 to monitor betting information such as event times, current odds, and projected or actual payouts for various Event Select offerings 13, for example. In some situations, such information may be updated substantially in real time or at preset intervals (such as every 30 seconds, for example) as new bets 12 are placed and/or as information regarding the offerings change, for example. Monitors 32 may include, for example, tote-boards or closed-circuit televisions located at an event site or off-site establishment.

On-site interfaces 26 and/or off-site interfaces 28 may also include one or more self-service betting machines 33. In some embodiment, self-service betting machines 33 allow bettors 20 to insert payment into the machine (such as cash or by using a voucher or a credit or debit card), place one or more Event Select bets 12, and receive a printout (such as a ticket, for example) indicating the bet or bets placed. Printouts for winning bets may be inserted into the self-service betting machine, such as to receive a payment voucher (which may be used to receive a payout from a teller 30) or to place additional bets 12. In other embodiments, self-service betting machines 33 allow bettors 20 to use a credit or debit card to place bets 12. The credit or debit card may have an associated account, which may be a betting account provided and/or managed by a betting account provider. In some embodiments, after the betting event is completed, a bettor 20 may insert or swipe his or her credit or debit card in the self-service betting machines 33 in order to update the balance on the card. Self-service betting machines 33 may also allow the bettor 20 to print out payment vouchers which may be presented to a teller 30 in order to receive payments.

As shown in FIG. 1, betting system interfaces 14 may also include various non-physical interfaces, such as one or more telephone operators 34 and one or more websites 36. Bettors 20 may access or communicate with such non-physical interfaces via one or more communications networks 44. Communications networks 44 may include one or more servers, routers, switches, repeaters, backbones, links and/or any other appropriate type of communication devices coupled by links such as wire line, optical, wireless, or other appropriate links. In general, communication network 28 may include any interconnection found on any communication network, such as a telephone network, a local area network (LAN), metropolitan area network (MAN), wide area network (WAN), the Internet, portions of the Internet, or any other data exchange system. To access betting system interfaces 14 using communication networks 44, bettors 20 may use a computer, a personal digital assistant (PDA), a cell-phone, a remote paging device, an electronic mail communication device, a handheld betting device, or any other suitable mobile device. In certain embodiments, bettors 20 may receive any suitable information, such as Event Select offering information, from betting system platform 16 via mobile devices using, for example, communication networks 44 and betting system interfaces 14.

Telephone operators 34 may communicate information concerning Event Select offerings 13 (such as event times, offering rules, betting options and odds, for example) to, and take bets 12 from, bettors 20. Similarly, websites 36 may communicate offering information to bettors 20 and allow bettors 20 to place bets 12. One or more of such websites 36 may be hosted by one or more servers associated with system 10, which server or servers may also host betting system platform 16 in some embodiments. In some embodiments, offering information available to bettors 20 via websites 36 may be updated substantially in real time or at preset intervals (such as every 30 seconds, for example) as new bets 12 are placed and/or as information regarding an offering changes, for example.

In some embodiments, one or more websites 36 may be provided by, or associated with, an Internet betting provider 46, for example. Internet betting provider 46 may provide Internet account wagering by providing online betting accounts to one or more bettors 20. Using an online betting account, a bettor 20 may interface with one or more websites 36 associated with the Internet betting provider 46 in order to fund the account, view Event Select offering information regarding offering events, and place Event Select bets. Such online betting accounts may include one or more various types of accounts, such as deposit accounts, credit accounts, stop-loss accounts, and hybrid accounts, for example.

As discussed above, betting system platform 16 is operable to communicate Event Select offerings 13 to betting system interfaces 14, receive Event Select bets 12 from betting system interfaces 14, store the received bets 12, determine appropriate payouts, and communicate such payouts to one or more of the betting system interfaces 14, which may then display such payouts to bettors 20. As shown in FIG. 1, betting system platform 16 includes a processor 38 coupled to a memory 40. Processor 38 is generally operable to execute various algorithms or calculations to determine Event Select offering data, such as current odds data 50, current pool data 52, current or potential payout data 54 and any other suitable information.

As discussed above, betting system platform 16 comprises processor 38 and memory 40. Processor 38 may comprise any suitable processor, such as a central processing unit (CPU) or other microprocessor, that executes a betting system software application 42 or other computer instructions and may include any suitable number of processors working together. Memory 40 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Memory 40 is generally operable to store various information that may be used by processor 38 in determining odds and/or payouts. For example, memory 40 may comprise any suitable number of databases, which may be co-located or physically and/or geographically distributed. In the example shown in FIG. 1, memory 40 may store any or all of the following: betting system software application 42, current odds data 50, current pool data 52, payout data 54, one or more event parameters 58, one or more Event Select offering parameters 60, one or more Event Select bet parameters 61, one or more calculation rules 62, one or more event results 64, and one or more Event Select offering results 66.

Event parameters 58 may comprise various parameters of one or more events, such as, for example, the type of event, the time, date and location of the event and/or the number (or in some cases, the name) of each of the participants in the event. Event Select offering parameters 60 may comprise various parameters of one or more Event Select offerings 13, include events offered for selection, requirements for corresponding bets 12 and the commission rate on the offerings 13. Event Select bet parameters 61 may also include information concerning received bets 12, such as the identity of the bettor 20 who placed the bet 12, the manner in which the bet 12 was placed (such as via telephone, the Internet, or in person at a track or OTB establishment, for example), the participant or participants covered by the bet 12 and/or the amount of the bet 12, for example. Calculation rules 62 may comprise various equations or other algorithms to be used by processor 38 in determining various current odds and/or payout data. Event results 64 may comprise various data regarding the results of one or more offering events, such as the winning participant of each event. Offering results 66 may comprise various data regarding the results of various Event Select offerings 13, such as whether bets 12 are winning bets, the identity of bettors 20 who place winning bets 12, the determined payout for the bet 12 and/or whether the payout was distributed to the bettor 20, for example. It should be understood that particular components stored in memory 40 may be combined or separated in any suitable manner in memory 40 according to particular needs. As an example, FIGS. 2A, 2B and 4 further discussed below illustrate examples of Event Select bet and result data, which may combine data from Event Select bet parameters 61, event results 64 and Event Select offering results 66.

As discussed above, one or more communications networks 18 couple and facilitate wireless and/or wireline communication between one or more betting system interfaces 14 and betting system platform 16. Each communication network 18 may include one or more servers, routers, switches, repeaters, backbones, links and/or any other appropriate type of communication devices coupled by links such as wire line, optical, wireless, or other appropriate links. In general, each communication network 18 may include any interconnection found on any communication network, such as a local area network (LAN), metropolitan area network (MAN), wide area network (WAN), the Internet, portions of the Internet, or any other data exchange system.

As discussed above, processor 38 is operable to execute betting system software application 42 to determine current odds data 50, current pool data 52, and/or payout data 54. Processor 38 may determine such data based at least on data received from memory 40 and/or one or more betting system interfaces 14. In addition, processor 38 may update such data based on new information being received by betting system platform 16. In some embodiments, processor 38 may update such data in real time, substantially in real time, or at preset intervals (such as every 30 seconds, for example).

As shown in FIG. 1, Event Select offerings 13 may be communicated to one or more betting system interfaces 14 via communications network 18. Such offerings may include current odds data 50, current pool data 52 and payout data 54. Offerings 13 may then be made available to bettors 20, such as via tote boards or monitors 32 located at a track or OTB establishment, for example, or on an appropriate website 36 that may be accessed by bettors 20, for example. In this manner, bettors 20 may have access to real-time or substantially real-time odds, pool and payout data regarding various Event Select offerings.

FIGS. 2A and 2B illustrate examples of Event Select bet and result data for example Event Select offerings. In the example Event Select offering of FIG. 2A, Bettors 1-4 are required to select six races out of a group twenty total races being held at four different tracks. As discussed above, offerings of other embodiments may require selection of a different number of events out of a group of a number offered other than twenty. Bettor 1 selects to bet on Races 2 and 5 at Track 1, Race 3 at Track 2, Races 1 and 2 at Track 3 and Race 3 at Track 4. Bettor 2 selects to bet on Races 1, 2, 3, 4 and 5 at Track 2 and Race 1 at Track 3. Bettor 3 selects to bet on Race 1 at Track 1, Races 1 and 5 at Track 2, Races 1 and 4 at Track 3 and Race 2 at Track 4. Bettor 4 selects to bet on Races 1, 3 and 5 at Track 3 and Races 2, 4 and 5 at Track 4. Each Bettor 1-4 selects a horse to win each of the bettors' respectively selected races. Comparing the races and horses selected to the actual race winners, one can see that Bettors 2 and 4 accurately selected the winners of each race they respectively selected in their Event Select bets. Bettor 1 accurately selected the winners of five out of six selected races (missed the winner of Race 3 at Track 2). Bettor 3 did not accurately select the winner of any of the bettor's selected races. Thus, Bettors 2 and 4 may each receive a portion of the total pari-mutuel payout for that particular Event Select offering. Bettors 1 and 3 will not be considered Event Select winners if the offering 13 had stipulated that a bet must correctly select winners of each respectively selected event to win. It should be understood that some embodiments may provide that an Event Select bet 12 missing one or more selected events may still be a winner.

In the example Event Select offering of FIG. 2B, Bettors 1-4 are required to select five games out of a group of ten games and three horse races out of a group of ten horse races. As indicated above, the horse races may be held at different tracks and at different times. In this example, each game includes two participating teams (Team A and Team B for each game), and each race includes a respective certain number of horses. In one embodiment, the group of ten games may comprise ten professional football games and the particular Event Select offering may be called "Ponies and Pros." As discussed above, the winning participant for the game events may be determined according to outright winner or by accounting for particular point spreads in each game.

As illustrated, Bettor 1 selects Games 1, 3, 4, 6 and 9 and Races 3, 5 and 8. Bettor 2 selects Games 3, 4, 5, 7 and 8 and Races 5, 6 and 7. Bettor 3 selects Games 1, 2, 5, 8 and 9 and Races 2, 4 and 8. Bettor 4 selects Games 1, 2, 3, 4 and 5 and Races 5, 8 and 9. Comparing the events and participants selected by each bettor to the actual winning participants for each event, one can see that Bettor 2 accurately selected the winning participant of each event Bettor 2 selected in the bettor's Event Select bet. Thus, Bettor 2 would receive a portion of the total payout for that particular Event Select offering.

As discussed above, in particular embodiments a portion of a particular Event Select offering payout may be paid to bettors accurately picking at least some of their respectively selected events. As evident in FIG. 2B, Bettor 1 correctly selected the winning team of each game selected by Bettor 1, and Bettor 3 correctly selected the winning horse of each race selected by Bettor 3. This particular Event Select offering could have designated that any bettor accurately selecting the winner of all of the bettor's selected games or all of the bettor's selected races would receive a portion of the Event Select offering payout even if the bettor did not accurately pick the winning participant in all events selected. If this were this case, Bettors 1 and 3 would thus receive at least a portion of the Event Select offering pari-mutuel payout. Of course in some embodiments an Event Select offering may designate that no bettor missing even a single event receive any portion of the Event Select offering payout if any other bettor correctly picks the winning participant of all of such other bettor's selected events. If this were the case in the example in FIG. 2B, then Bettors 1 and 3 would receive no portion of the Event Select offering payout since Bettor 2 correctly picked all events selected by Bettor 2.

In particular embodiments, an Event Select offering that requires selection of a certain number of events out of a group of events may allow bettors to select fewer events if bettors' selected participants in their selected events have certain odds (e.g., longer odds than other participants in the events). The bets received from such bettors that select the fewer events may still be combined with bets received from bettors selecting a greater number of events to constitute the particular Event Select offering pool. For example, a particular Event Select offering may require selection of six horse races and their winning participants but may allow a bettor to select only four races if the bettor selects horses that are 10-1 odds or longer to win each of the bettor's four selected races. If the bettor's four selected "longshot" horses were to win each of their respective races, then the bettor may receive a portion of the Event Select offering payout just as if the bettor had correctly selected six "favored" horses to win their respective races. Thus, bettors may be permitted to select fewer events if the participants selected by the bettors in such events have longer odds.

In some embodiments, a bettor who selects participants having longer odds may receive a greater portion of an Event Select offering payout upon winning an Event Select bet than a bettor selecting participants that do not have long odds. For example, if a bettor placing an Event Select bet correctly chooses winning participants that each have 5-1 or longer odds in the bettor's selected events, then that bettor may receive 1.5 times the payout of another bettor who accurately picked winning participants that had lower than 5-1 odds in such bettor's selected events.

When participant odds are taken into account in Event Select bets (e.g., in determining the number of events a bettor must select or in determining payout portion for a winning bettor), certain weighted averages known in the wagering industry may be used to determine payouts or number of events required for selection. Moreover, the odds used for such purposes may be the odds as of any particularly designated time, such as final odds just prior to an event, morning odds or when the bettor actually places their Event Select bet. If final odds are used to determine a bonus for a bettor, such as an increased winning payout or opportunity to select fewer winners, then the bettor may face a risk when placing his bet to achieve the bonus. This is because a participant may have certain odds when a bet is placed, but those odds may change by the time the participant's final odds are determined. Thus, a bettor may select certain participants to win selected events in an effort to achieve a bonus given based on selecting participants having specified odds, but the bettor may end up not being eligible for the bonus if odds change such that final odds for a participant are less than the specified odds required for the bonus.

Other examples where bettors selecting participants having less probability of winning may be used to allow fewer events to be selected or to provide for greater payout upon winning may include the selection of lower seeded teams in a sports tournament (e.g., NCAA basketball tournament) or the selection of other "underdog" teams, such as underdogs having certain point spreads in an Event Select bet where the winning participant is determined by outright event winner.

In some embodiments, an Event Select offering may require selection of one or more certain specified events and such events' winning participants in order to be eligible for the Event Select offering payout. For example, an Event Select offering may require selection of six horse races out of a group of horse races and may stipulate that one of the selected horse races must be the Kentucky Derby.

In particular embodiments, an Event Select offering may allow a bettor to select fewer events, gain a larger portion of the Event Select offering payout or allow a bettor to miss one of the bettor's selected events if the bettor selects a certain specified event and its winning participant. As an example, an Event Select offering that requires selection of a certain number of horse races and their winning participants to win a portion of the payout may provide that a bettor selecting the Kentucky Derby (and its winning horse) as one of the bettor's selected races may receive a greater portion of the Event Select offering payout upon correctly picking winning participants of all its selected races than another bettor who correctly picked the winner of six selected races but did not include the Kentucky Derby. As another example, an Event Select offering that requires selection of six events may provide that bettors selecting the Kentucky Derby as one of their events only have to select a total of five events (one being the Kentucky Derby) and their winning participants. As an additional example, an Event Select offering that requires selection of seven events and their winning participants in order to receive any portion of the payout may allow a bettor to receive a portion of the payout if the bettor does not correctly pick the winning participant of one of the bettor's selected events but does select the Kentucky Derby (and its winning participant) as one of the bettor's selected events. Such a bettor may receive the same portion of the payout as another bettor accurately selecting the winner of all respectively selected events in some cases.

As discussed above, credit or benefit may be given to bettors for selecting participants having longer odds (e.g., longshot horses or seeded or point spread underdogs) or correctly selecting the winners of certain specified events in their Event Select bets. Specified events for selection that may make a bet eligible for such credit or benefit may be specified at any time. For example, the offering 13 may specify events that may be selected for such credit or benefit. In some embodiments, events that make a bet eligible for a credit or benefit may be specified after bets 12 are received or after event results are received. In these cases, such specified events may constitute a "wildcard" bonus in that bettors do not know prior to placing their bets which events to select to make their bets eligible for the bonus.

As discussed above, Event Select offerings 13 may stipulate provisions or parameters that trigger credit, benefit or bonus. A provision that triggers such a credit, benefit or bonus may be referred to herein as an "adjustment parameter" (e.g., selecting participants having longer odds or correctly selecting winners of certain specified events). Adjustment parameters may lead to a credit, benefit or bonus that may include, among other incentives, a larger portion of the Event Select offering payout, allowing the bettor to select fewer events or allowing the bettor to get fewer events correct out of their events selected. It should be understood particular embodiments may utilize various types of adjustment parameters not specifically enumerated herein to provide extra credit, benefits or bonuses.

In some cases, a bettor may be allowed to miss one or more events and still receive an identical portion of an Event Select offering payout received by a bettor who does not miss any events if the bettor that missed one or more events pays more (i.e., wagers more) for his Event Select bet. For example, a bettor that wagers $2 and correctly picks winning participants in five out of six events selected by the bettor may receive the same portion of an Event Select offering payout as another bettor that wagers $1 but correctly picks winning participants in six out of six events selected by such bettor.

It is possible that some events of a particular Event Select offering may be cancelled or suspended or may otherwise constitute a "no contest" event such that no winner is determined. This may occur on some occasions, for example, as a result of bad weather. In this case, Event Select bets may exist that may not have missed a selected event that actually took place. For example, bad weather may force the cancellation of consecutively scheduled events (e.g., Events 10, 11, 12, 13, 14 and 15 at a track on a particular day), or some other problem could force the cancellation of non-consecutive events occurring at different places at different times. Certain Event Select bettors may still have correctly selected the winning participants in all respectively selected races. Moreover, other Event Select bettors may have Event Select bets that are "still alive" in that they have not yet missed selecting a winner of any of their selected races. In these situations, some or all of that Event Select offering's payout may be distributed according to any suitable formula, algorithm or method. It should be understood that such a formula, algorithm or method may change according number of events for selection, type of offering 13 or any other factor. In some cases no portion of an Event Select offering payout may be distributed in the event of any cancelled, suspended or "no contest" events, and such payout may or may not carry over to a future Event Select offering.

As discussed above, processor 38 may calculate various current or potential Event Select offering payout data using various algorithms or equations. FIG. 3 illustrates examples of such algorithms or equations in accordance with one embodiment of the present invention. In particular, FIG. 3 illustrates various equations for calculating the current potential payout for an Event Select offering 13.

In particular, FIG. 3 illustrates equation 100 which indicates that a particular Event Select offering's bets received constitutes the Event Select offering pool. Equation 102 shows that an Event Select offering's take-out is calculated by multiplying a certain commission (e.g., 15%) by the Event Select offering pool. In equation 104, the Event Select offering payout is determined by subtracting the Event Select offering take-out from the Event Select offering pool and adding any Event Select carryover from previous Event Select offering. As discussed above, some Event Select offerings may include a carryover from one or more previous Event Select offerings while other Event Select offerings may include no carryover in the Event Select offering payout.

FIG. 4 illustrates an example of Event Select bet and result data for an example Event Select offering. In this example, some of the concepts discussed above relating to extra credit or benefit are utilized and combined into one Event Select offering. For the example, the Event Select offering stipulates that each bettor must select five races (and their winning horses) out of a group of ten possible races. To win any portion of the Event Select payout, a bettor must correctly pick the winning horses of each of the bettor's respectively selected races. Moreover, the Event Select offering includes an adjustment parameter indicating that the bettor may also pick the winner of the Kentucky Derby (not one of the ten races from which a bettor must select five). If the bettor correctly picks the winner of the bettor's five other races and correctly picks the winner of the Kentucky Derby, then the bettor will get double the payout (i.e., a "Kentucky Derby bonus") than if the bettor merely correctly picked the winner of the bettor's five selected races. In addition, the Event Select offering includes another adjustment parameter indicating that if a bettor correctly picks the winning horse of the bettor's five selected races and each such winning horse had 10-1 or longer odds, then the bettor will receive nine times the payout (i.e., a "longshot bonus") than if any of the bettor's winning participants had shorter than 10-1 odds. Finally, payouts will be distributed on a per dollar wagered basis, taking any bonuses into account for satisfaction of the adjustment parameters.

As illustrated, Bettor 1 selects Races 2, 4, 6, 7 and 8. Bettor 2 selects Races 1, 3, 4, 8 and 9. Bettor 3 selects Races 1, 2, 6, 9 and 10. Bettor 4 selects races 3, 4, 5, 6 and 7. Each bettor also selects a participant to win the Kentucky Derby in an effort to gain the double payout Kentucky Derby bonus. As evident from the results given, both Bettors 2 and 3 correctly picked the winner of each of their five respectively selected races. Moreover, each of such winners for Bettor 2 had 10-1 or longer odds. In addition, Bettor 3 correctly selected the winner of the Kentucky Derby. Furthermore, Bettor 2 wagered $5.00, and Bettor 3 wagered $2.00.

For the purposes of calculating the total amount of the Event Select payout that Bettors 2 and 3 will receive, it will be assumed that the total Event Select pool for this Event Select offering is $100,000 with no carryover from previous Event Select bets, the take-out is 15%, and there are no other Event Select bets that correctly selected the winner of five selected races (other than the bets of Bettors 2 and 3). Thus, the total Event Select offering payout will be $85,000. Bettor 2 wagered $5.00 and Bettor 3 wagered $2.00, so Bettor 2 would normally receive 2.5 times the amount received by Bettor 3 without any additional bonuses. However, Bettor 2 will receive the longshot bonus (9 times credit), and Bettor 3 will receive the Kentucky Derby bonus (double credit). So, if a point system was used, then Bettor 2 would have 45 total points ((5 points for each dollar wagered)×(the 9 times credit)), and Bettor 3 would have 4 total points ((2 points for each dollar wagered)×(the 2 times credit)). Therefore there are 49 total points. Bettor 2 will receive 45/49 of the payout, and Bettor 3 will receive 4/49 of the payout. Thus, Bettor 2 will receive $78,061.22 of the $85,000 payout, and Bettor 3 will receive $6,938.78. It should be understood that the example described with respect to FIG. 4 is merely an example of the manner in which selecting participants with longer odds or selecting the winner of a specified event may enable a bettor to receive extra credit or benefit in determining a winning portion of an Event Select offering payout. Other embodiments may utilize other methods for dividing an Event Select offering payout among bettors with winning bets.

Figure 5:
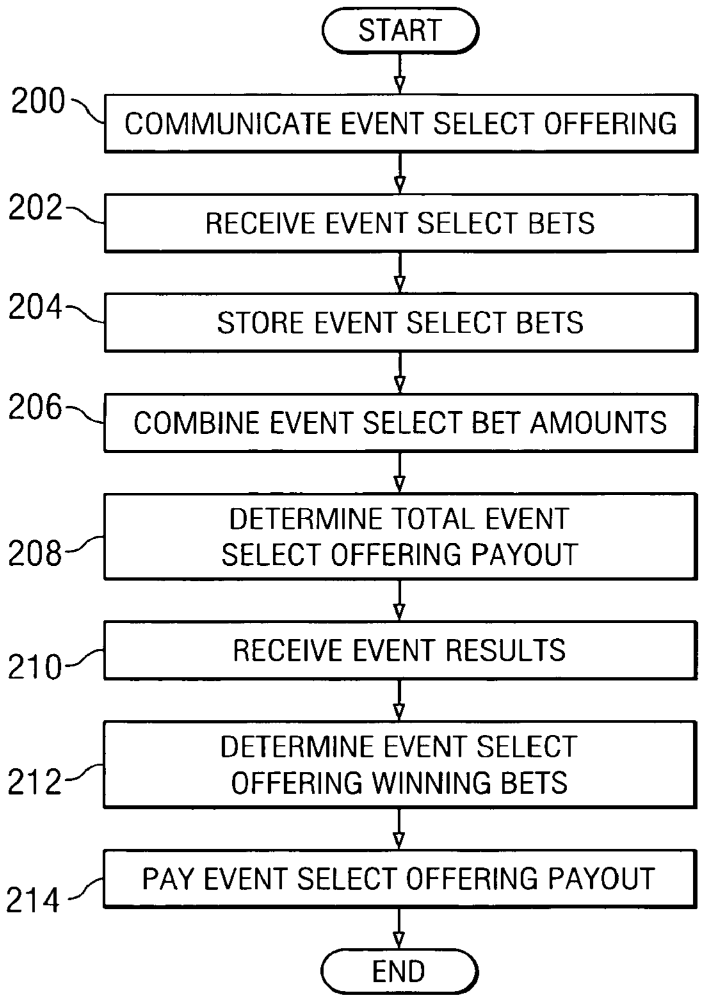
FIG. 5 is a flowchart illustrating an example method of receiving, managing and paying Event Select bets, in accordance with an embodiment of the present invention.

FIG. 5 is a flowchart illustrating an example method of receiving, managing and paying Event Select bets 12, in accordance with an embodiment of the present invention. At step 200, an Event Select offering is communicated to bettors 20. The offering may be communicated to one or more betting system interfaces 14. The offering may stipulate a number of events that a bet 12 corresponding to the offering must select and a group of events from which the selected events must be selected. The offering may also provide certain incentives or bonuses for satisfying adjustment parameters, such as selecting specified events (e.g., the Kentucky Derby or the Super Bowl) or selecting participants having specified odds to win selected events. It should be understood that certain bonuses (e.g., identification of certain events that make a bet eligible for a bonus) may be specifically identified at a later time, such as after bets or results are received. Incentives or bonuses may include a higher portion of the offering payout for winning, the opportunity to select fewer events and still win or the opportunity to win even while missing one or more winning participants of the events selected. At step 202, Event Select bets 12 are received from one or more bettors 20 via one or more betting system interfaces 14. Each Event Select bet 12 received includes a selection of a certain number of events selected from a group of events stipulated in the Event Select offering 13, a selection of a respective participant for each of the events selected and a bet amount. Each Event Select bet 12 may be stored at step 204, such as within memory 40, for example.

At step 206, the Event Select bet amounts may be combined to form the Event Select offering's pool. At step 208, a total Event Select offering payout is determined. Such determination may include deducting a commission from the Event Select offering pool, such as by applying a commission rate to the pool. The determination of the Event Select payout may also include adding an Event Select offering carryover amount from a previous Event Select offering.

At step 210 the results of the offering events are received. Such results may include an identification of a winning participant for each offering event. At step 212, Event Select winning bets are determined from the Event Select bets 12 received and stored at steps 202 and 204, respectively. In some cases, an Event Select bet 12 may be considered a winning bet only if the Event Select bet 12 includes a correct selection of winning participants for each event selected in the bet. In other cases, an Event Select bet 12 may be entitled to some winning amount if the bet 12 includes a correct selection of a winning participant for at least one of the races selected in the bet. This may be the case if no Event Select bets 12 received include a correct selection of winning horses for each race respectively selected or if the particular Event Select bet 12 satisfies some specified incentive allowing for a bet 12 to miss one or more selected events. At step 214, an Event Select payout may be paid to bettors 20 with winning Event Select bets 12. A payout amount may be determined based on a per dollar wagered basis, taking into account any payout incentives stipulated in the Event Select offering 13. In some cases, a certain amount of the Event Select payout for the offering may carry over to a future Event Select offering if no Event Select bets 12 received include a correct selection of winning participants for each event respectively selected.

Some of the steps illustrated in FIG. 5 may be combined, modified or deleted where appropriate, and additional steps may also be added to the flowchart. Additionally, steps may be performed in any suitable order without departing from the scope of the invention.

As discussed above, various embodiments of invention provide a number of advantages. One advantage is that a bettor may select the events that the bettor feels he has the best chance to correctly pick the winners. Such selected events may include the most favored participants out of the possible events for selection. If a bettor misses one of his selected events early, the bettor can re-enter the pool by placing an additional bet and selecting additional events that have not yet taken place. In some cases, bettors may win their selected events before all the events are complete, thus giving the bettor an incentive to stay at a betting site longer to collect the bettor's winnings (since the final payout may not be determined until there are no more Event Select bets for a particular Event Select offering with a chance at winning) Staying at a betting site longer may mean that the bettor places additional bets at the site thus increasing profit. Bettors may watch the Event Select offering pool grow thus providing a greater incentive to place an Event Select bet in the event of a large Event Select offering pool.

Although the present invention have been described in detail with reference to particular embodiments, it should be understood that various other changes, substitutions, and alterations may be made hereto without departing from the spirit and scope of the present invention. For example, although the present invention has been described with reference to a number of elements included within system 10, including betting system interfaces 14 and betting system platform 16, these elements may be combined, rearranged or positioned in order to accommodate particular routing architectures or needs. In addition, components of any of these elements may be provided as separate external components where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A non-transitory machine-readable medium to have instructions stored thereon which are configured to, when executed by at least one processor of at least one computer in electronic communication with at least one other computer via an electronic communications network, direct the at least one processor to:

receive at least one electronic message comprising a plurality of group bets from a plurality of bettors, each group bet being received from one of the plurality of bettors via a computing device in networked communication with the at least one processor, each group bet comprising:

plurality of events selected from among a group of events offered by a sponsor of the group bets, each event having a plurality of participants;

a respective participant selected for each of the plurality of events selected for the group bet; and a bet amount;

combine the amounts of the group bets of the plurality to form a betting pool, in which the amounts of the group bets are combined by combining amounts of different bets having different selected combinations of events and different selected participants from each other that are pooled together in the betting pool, in which the combining the amounts to form the betting pool comprises causing data representing the combined amounts to be stored in a database in electronic communication with the at least one processor; and compute an amount of a payout for one or more winning group bets of the plurality based at least in part on the combined amounts of the bets in the betting pool; and determine whether to cause a dispense of the amount of the payout at an interface associated with a self-service machine.

2. The non-transitory machine-readable medium of claim 1, in which the instructions are further configured to, when executed, direct the at least one processor to:

receive results of the group of events, the results identifying a winning participant for each event of the group of events; and determine one or more winning group bets of the plurality of group bets based at least in part on the results, in which for each group bet, the plurality of events is selected from among a group of events by a respective one of the plurality of bettors.

3. The non-transitory machine-readable medium of claim 2, wherein:

a rule for determining a payout to a winning group bet is based at least in part on whether at least some of the selected respective participants selected in a respective group bet correspond to a winning participant for each of the plurality of events selected in the respective group bet and the respective group bet of the plurality of group bets includes a winning participant of a specified event.

4. The non-transitory machine-readable medium of claim 2, wherein:

a rule for determining a payout to a winning group bet is based at least in part on whether at least some of the selected respective participants selected in a respective group bet correspond to a winning participant for each of the plurality of events selected in the respective group bet and the respective group bet amount is at least as high as a specified amount.

5. The non-transitory machine-readable medium of claim 2, wherein:

a rule for determining a payout to a winning group bet is based at least in part on whether at least some of the selected respective participants selected in a respective group bet correspond to a winning participant for each of the plurality of events selected in the respective group bet and the selected respective participants of the respective group bet comprise participants having specified odds.

6. The non-transitory machine-readable medium of claim 2, in which the instructions are further configured to, when executed, direct the at least one processor to:

increase a payout for a first winning group bet of the one or more winning group bets relative to a pari-mutuel payout for the winning participant of the event of the first winning group bet, the increase being based at least in part on relative odds among the winning participants of the winning group bets in the pool.

7. The non-transitory machine-readable medium of claim 6, wherein an amount to be paid for each winning group bet is determined based on the odds of the selected respective participants of each winning bet.

8. The non-transitory machine-readable medium of claim 2, in which the instructions are further configured to, when executed, direct the at least one processor to:

increase a payout for a first winning group bet of the one or more winning group bets relative to a pari-mutuel payout for the winning participant of the event of the first winning group bet, the increase being based at least in part on a relative amount bet on the events in the pool.

9. The non-transitory machine-readable medium of claim 2, in which the instructions are further configured to, when executed, direct the at least one processor to:

increase a payout for a first winning group bet of the one or more winning group bets relative to a pari-mutuel payout for only the bets on the same event as the first winning group bet, the increase being based at least in part on the first winning group bet's selected respective participants for each of the respective selected plurality of events each having specified odds.

10. The non-transitory machine-readable medium of claim 2, in which the instructions are further configured to, when executed, direct the at least one processor to:

increase a payout for a first winning group bet of the one or more winning group bets relative to a pari-mutuel payout for the winning participant of the event of the first winning group bet, the increase being based at least in part on a selection of the first winning group bets' event for a bonus, the selection being known to bettors while group bets are received.

11. The non-transitory machine-readable medium of claim 2, in which the instructions are further configured to, when executed, direct the at least one processor to:

increase a payout for a first winning group bet of the one or more winning group bets relative to a pari-mutuel payout for the winning participant of the event of the first winning group bet, the increase being based at least in part on a selection of the first winning group bets' event for a bonus, the selection occurring after group bets are received.

12. The non-transitory machine-readable medium of claim 1, wherein an amount of a total payout is determined based at least in part on the betting pool and by adding to the betting pool a carryover amount from a previous betting pool, and wherein for at least one of the plurality of group bets, the respective selected plurality of events comprises events held on different days.

13. The non-transitory machine-readable medium of claim 1, in which the instructions are further configured to, when executed, direct the at least one processor to:

receive results of the group of events, the results identifying a winning participant for each event of the group of events;

determine whether there are any winning group bets based at least in part on determining, for each of the plurality of group bets, if each respective selected participant corresponds to the winning participant for each of the plurality of events selected in the respective group bet; and determine a carryover amount to carry over to a future total payout if there are no winning group bets.

14. The non-transitory machine-readable medium of claim 1, in which the instructions are further configured to, when executed, direct the at least one processor to:

cancel at least one event of the group of events;

receive results of the group of events, the results identifying a winning participant for at least one event of the group of events; and determine one or more winning group bets by determining for each of the plurality of group bets if at least one of the selected respective participants corresponds to the winning participant for at least one of the plurality of events selected in the group bet, wherein, for at least one of the plurality of group bets, the respective selected event comprises horse racing events held at different tracks.

15. The non-transitory machine-readable medium of claim 1, wherein, for at least one of the plurality of group bets, the respective selected plurality of events comprises two or more events selected from the group consisting of horse racing, dog racing, basketball, football, baseball, hockey, soccer, jai-alai, golf, boxing, rugby, cricket, auto racing, bicycle racing, tennis, Olympic or other sporting events.

16. The non-transitory machine-readable medium of claim 15, wherein, for at least one of the plurality of group bets, the respective selected plurality of events comprises at least one horse racing event and at least one football event, and in which the instructions are further configured to, when executed, direct the at least one processor to:

stipulate an adjustment parameter that provides a bonus to the plurality of group bets upon satisfaction of the adjustment parameter.

17. The non-transitory machine-readable medium of claim 15, wherein the plurality of events comprises at least one football event and at least one basketball event.

18. The non-transitory machine-readable medium of claim 15, wherein, for at least one of the plurality of group bets, the respective selected plurality of events comprises:

a first event selected from events from the group consisting of a horse racing, dog racing, basketball, football, baseball, hockey, soccer, jai-alai, golf, boxing, rugby, cricket, auto racing, bicycle racing, tennis, Olympic, political or entertainment event; and a second event selected from events from the group consisting of a horse racing, dog racing, basketball, football, baseball, hockey, soccer, jai-alai, golf, boxing, rugby, cricket, auto racing, bicycle racing, tennis, Olympic, political or entertainment event, wherein the first event and the second event comprise different types of events.

19. A non-transitory machine-readable medium to have instructions stored thereon which are configured to, when executed by at least one processor of at least one computer in electronic communication with at least one other computer via an electronic communications network, direct the at least one processor to:

receive at least one electronic message comprising a plurality of bets, in which bet is received via a computing device in networked communication with the at least one processor, each bet comprising:

a set of events selected from a group of events;

a selected participant for each event of the set of events selected; and a bet amount;

combine each bet amount to form a betting pool, in which each bet amount is combined to form a betting pool comprises causing data representing the combined bet amounts to be stored in a database in electronic communication with the at least one processor;

determine an amount of a total payout based at least in part on the betting pool;

receive via an electronic interface electronic data indicating results of the group of events, the results identifying a winning participant for each event of the group of events;

determine one or more winning bets of the plurality of bets by determining, for each of the plurality of bets, if each selected respective participant of the respective bet corresponds to the winning participant for each event of the set of events selected in the respective bet;

determine an amount to be paid for a winning bet of the one or more winning bets based on the one or more winning bets, the amount of the total payout, and the bet amount of the winning bet; and determine whether to cause a dispense of the amount to be paid at an interface associated with a self-service machine.

20. A non-transitory machine-readable medium to have instructions stored thereon which are configured to, when executed by at least one processor of at least one computer in electronic communication with at least one other computer via an electronic communications network, direct the at least one processor to:

accept from a user a group bet that selects an event and outcome of the event on which to bet, each event available for betting having a plurality of participants, the outcome of the event depending on performance of the participants, the group bet being input via a computer entry device;

transmit an electronic message comprising information about the group bet, in which the electronic message is transmitted by forwarding the group bet for assembly of a plurality of group bets from a plurality of users into a betting pool, each group bet in the plurality including a designation of an event and an amount, the plurality of group bets in the betting pool including group bets on a plurality of distinct events such that at least one of the plurality of distinct events is selected in one of the plurality of group bets and not selected in another of the plurality of group bets, the betting pool to be processed by a processor to determine a payout for one or more winning group bets of the plurality based on the outcomes of at least two events designated by group bets in the betting pool, in which information about the betting pool is stored in a database in electronic communication with the at least one processor; and determine whether to cause a dispense of the payout at an interface associated with a self-service machine.

* * * * *